July 12, 1927.  
H. J. ROCKWELL  
1,635,559  
THERMOSTATIC GAS REGULATOR  
Filed July 31, 1922
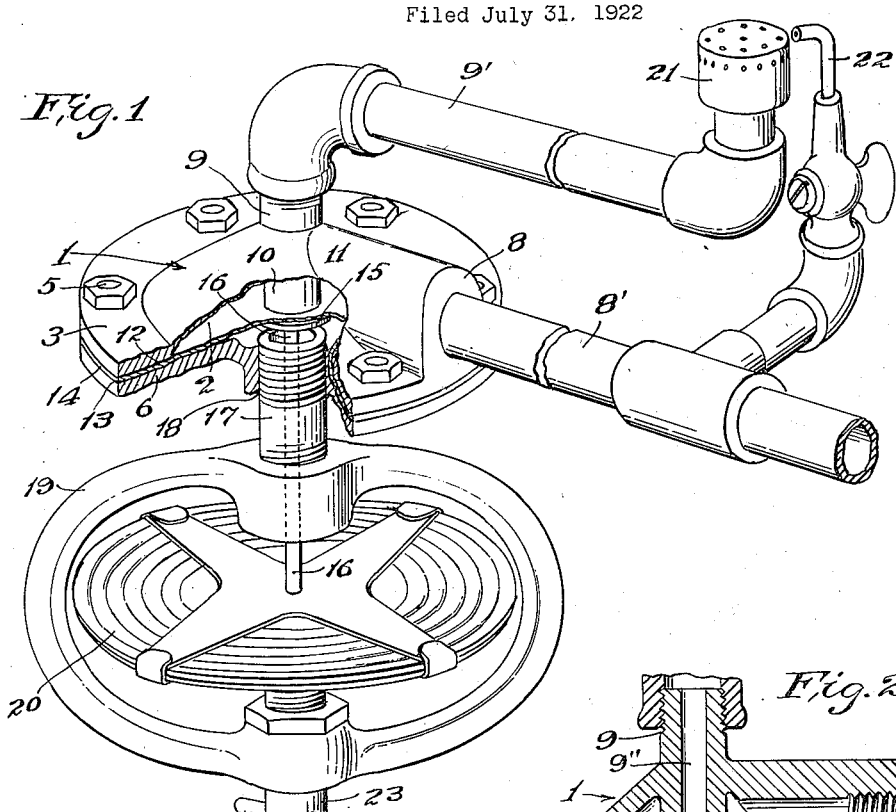
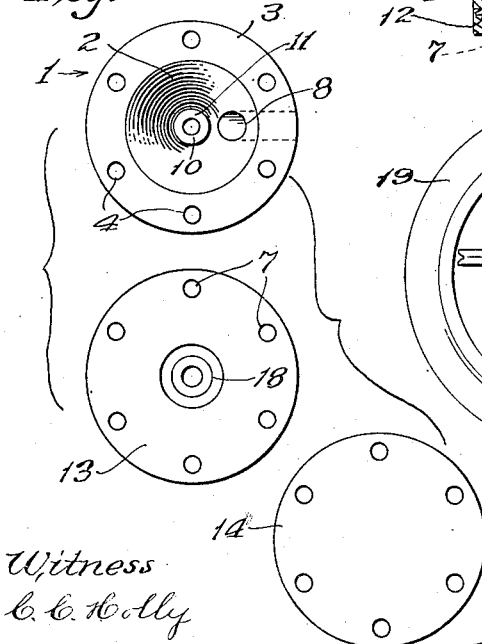
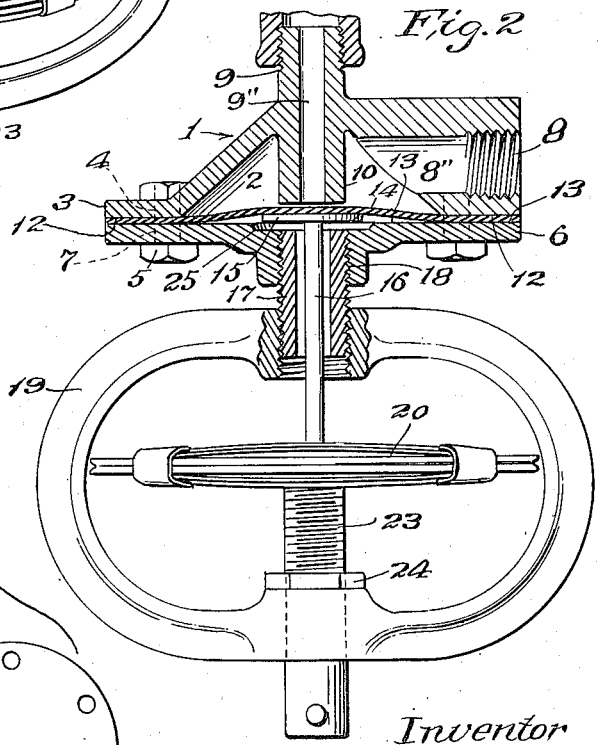
Witness  
C. C. Holly
Inventor  
Harry J. Rockwell  
by James R. Townsend  
his atty.

Patented July 12, 1927.

1,635,559

UNITED STATES PATENT OFFICE.

HARRY J. ROCKWELL, OF BELLFLOWER, CALIFORNIA.

THERMOSTATIC GAS REGULATOR.

Application filed July 31, 1922. Serial No. 578,780.

This invention relates to heat operated means for regulating the flow of gas to a burner for the purpose of regulating the heat of compartments or rooms heated by such burner; and the invention is applicable to regulating the heat of incubators and brooders.

An object of this invention is to provide a cheap and simple regulator, wherein the thermostat is responsive to changes in temperature of the surrounding atmosphere, and which will be absolutely reliable and will not stick.

The invention is broadly new, basic and pioneer in that I provide a cup member and a cap therefor, with gas inlet and outlet open to the cavity of the cup, there being a diaphragm between the cap and the cup and a thermostat operated member arranged opposite to the outlet from the cup and adapted to operate under pressure of a thermostat, to press the diaphragm toward the outlet to diminish the gas flow when the heat of the surrounding atmosphere exceeds the desired temperature, and to allow the diaphragm to be withdrawn as the heat of the compartment falls below such temperature.

Other objects are simplicity, ease of assembly, construction, operation and adjustment for varying the flow of gas.

In this invention the diaphragm is arranged below the outlet it controls so that the force of gravity and the gas pressure cooperate to open the outlet when the thermostat contracts under falling temperature and the outlet is through a nozzle so that a maximum area of the diaphragm is acted on by the gas pressure to make the diaphragm follow the thermostat operated member.

Other objects, advantages and features of invention may appear from the accompanying drawing, the subjoined detail description and the appended claims.

The accompanying drawing illustrates the invention.

Figure 1 is a broken perspective view of a regulator constructed in accordance with this invention with thermostat attached, and with gas inlet pipe, pilot light and burner, also shown.

Fig. 2 is an axial section of the regulator shown in Fig. 1, with broken side elevation of the thermostat in place.

Fig. 3 is an inside view in reduced scale, of the cup, cap and diaphragm separated and laid side by side.

The cup 1 has a concavity 2 surrounded by a diaphragm seating flange 3 having holes 4 therethrough to receive the bolts 5 that fasten in place the cap 6 that is provided with holes 7 to receive the bolts. The cup is provided with threaded connections 8, 9, to permit the attachment of the gas inlet pipe 8' and the gas outlet pipe 9' for the admission of gas through the inlet 8" which is in constant communication with the concavity 2, and to allow the gas to issue from the concavity through the outlet nozzle 10 that extends from the bottom of the concavity nearly to the plane of the open end or mouth thereof and terminates in a flat face 11 that is in a plane parallel to the plane of the diaphragm receiving face or seat 12 of the flange 3.

Preferably the inner face 13 of the cap is mainly flat and the diaphragm 14 is a flexible sheet adapted to yield to the nozzle 10. The thermostat rod 16 operates freely through the pipe 17 that is screwed into the central threaded orifice 18 of the cap 6, and is operably connected to the thermostat supporting member 19. Said thermostat rod is operable by a thermostatic ether wafer 20 or by any other suitable contrivance well known in the art, for pressing the diaphragm 14 toward the outlet nozzle 10 as the heat increases and expands the wafer 20, and to allow the diaphragm to be pressed away from the nozzle by the gas pressure as the heat decreases and allows the wafer to contract.

The diaphragm 14 may be made of any suitable sheet material impermeable to the gas and adapted to cooperate with the flat face of the outlet nozzle to diminish the space through which the gas may flow to the outlet as the temperature of the surrounding atmosphere increases. Such diaphragm is spaced from the outlet and may be of either rubber, rubberized cloth, or any other materials used for similar purposes.

In practical operation the gas under its normal pressure has free access to the outlet 9" but as the thermostat expands it forces the center of the diaphragm 14 toward the flat face 11 of the outlet nozzle and diminishes the flow of gas into the outlet 9" from the concavity of the cup.

As the flow of gas into the outlet 9" is diminished the flame at the burner 21 secured to one end of the gas outlet pipe 9' is correspondingly diminished and the temperature of the room or chamber is reduced. A pilot light 22 in direct connection with the gas inlet pipe 8' may be kept burning to insure ignition of the gas at the burner when gas flows therefrom after the flame has been extinguished which may be caused by the diaphragm 14 completely closing the outlet 9".

It is thus seen that there are no parts likely to stick to hold the diaphragm towards the outlet 9" and thereby continue the reduction of gas flow when the pressure of the thermostat on the diaphragm is reduced, and consequently the regulator is very sensitive to turn on the gas at any reduction of the temperature of the surrounding atmosphere and the operation of shutting off the gas is positive from the expansion of the thermostat.

The thermostat may be adjusted to close the outlet 9" at a predetermined atmospheric temperature by raising or lowering the wafer 20 in the thermostat supporting member 19 and thereby raising the thermostat operated member 15 by means of the adjusting screw 23 which is in threaded engagement with the supporting member 19. A lock nut 24 is adapted to lock the screw 23 in adjusted position. The screw 23 also serves as a support for the thermostatic wafer 20.

An advantage is that by securing the diaphragm 14 between the cap and the cup a leak-proof connection is made therebetween. The diaphragm thereby forms a leak-proof cover for the concavity 2 and permits the opening in the pipe 17 to be made sufficiently large to allow free movement of the thermostat rod 16 therein.

Another advantage is that the gas inlet and outlet are so arranged that the gas pressure is applied over practically the entire surface of the diaphragm when the gas outlet 9" is closed and thereby causes the diaphragm to retract at the slightest contraction of the thermostat wafer 20, thus giving minute adjustments of the gas outlet corresponding to the minute retraction of the wafer.

The inner face of the cap 6 is centrally recessed as at 25 to accommodate the head of the member 15 so that when the thermostat is fully contracted the flat surface will support the diaphragm throughout while the surrounding atmosphere temperature is low.

I claim:

1. A thermostatic gas regulator comprising a cup, a cap therefor, a diaphragm between said cup and cap and extending over the cavity of the cup, said cup being provided with a gas inlet and a gas outlet, the orifice of said gas outlet being adjacent to the plane of the diaphragm, and sufficiently spaced therefrom to allow free flow of gas to the outlet, and thermostatic means responsive to changes in temperature of the surrounding atmosphere for pressing the diaphragm toward the outlet to diminish the flow of gas from the cup.

2. A thermostatic gas regulator valve comprising a cup provided with a gas inlet and outlet, a cap on the bottom thereof, a diaphragm secured between said cap and said cup and covering the opening of said cup, and a thermostatic member adapted to press the diaphragm upwardly against the normal pressure of gas in the cup to close the outlet from said cup.

3. In a device of the character described, a cup having a gas inlet and a gas outlet; a cap secured to said cup, a diaphragm between said cup and cap and covering the opening of said cup; a pipe secured to said cap; a thermostatic supporting member secured to said pipe and thermostat operated means supported by said supporting member and operating through said pipe and cap and adapted to move said diaphragm to close the gas outlet of said cup.

4. In a device of the character described, a cup having a flange; a cap therefor, a diaphragm between said flange and said cap and extending over the cavity of the cup; said cup being provided with a gas inlet and outlet so arranged that pressure from gas entering the gas inlet will bear against approximately the entire surface of the diaphragm at all times; and thermostatic means responsive to changes in temperature of the surrounding atmosphere for moving said diaphragm to regulate the flow of gas into said outlet from said cup.

5. In a thermostatic gas regulator, a cup having a gas inlet and a gas outlet nozzle terminating in a flat face; a cap; a diaphragm spaced from and cooperating with the flat face of said outlet nozzle and secured in a plane parallel thereto between said cap and cup; a pipe secured to said cap; a thermostatic supporting member secured to said pipe; a rod operating freely through said pipe; thermostatic means supported by said supporting member adapted to operate said rod to move said diaphragm to control said outlet; and means in said support to vary the space between the diaphragm and the nozzle.

6. In a device of the character described, a cup having a flange; a cap therefor; a diaphragm between said flange and said cap and extending over the cavity of the cup, said cup being provided with a gas inlet and outlet so arranged that pressure from the gas entering the gas inlet will bear against approximately the entire surface of the diaphragm at all times, said diaphragm extending over and being adapted to close said outlet; and thermostatic means responsive to changes in temperature of the surrounding atmosphere to actuate said diaphragm.

7. In a device of the character described, a cup; a cap therefor; a diaphragm between said cup and said cap and extending over the cavity of the cup, said cup being provided with a gas inlet and outlet so arranged that pressure from gas entering the gas inlet will bear against approximately the entire surface of the diaphragm at all times. said diaphragm extending over and being adapted to close said outlet; and thermostatic means responsive to changes in temperature of the surrounding atmosphere to actuate said diaphragm.

In testimony whereof, I have hereunto set my hand at Los Angeles, California, this 24th day of July, 1922.

HARRY J. ROCKWELL.